Figure 1:
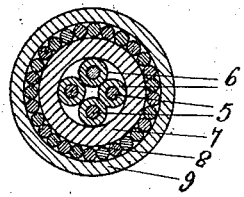

K. W. WAGNER.
TELEPHONE CABLE.
APPLICATION FILED FEB. 16, 1915.

1,153,655.

Patented Sept. 14, 1915.

Witnesses:

Inventor:
K. W. Wagner

UNITED STATES PATENT OFFICE.

KARL WILLY WAGNER, OF BERLIN-LANKWITZ, GERMANY.

TELEPHONE-CABLE.

1,153,655.     Specification of Letters Patent.     Patented Sept. 14, 1915.

Application filed February 16, 1915. Serial No. 8,641.

*To all whom it may concern:*

Be it known that I, KARL WILLY WAGNER, doctor phil. and professor of technical arts, a subject of the Emperor of Germany, residing at Berlin-Lankwitz, Germany, have invented new and useful Improvements in Telephone-Cables, of which the following is a specification.

My invention relates to improvements in telephone cables.

In telephone cables the transmission of the talking currents is so much the better the smaller the coefficient of damping is. Therefore it has been suggested to reduce the damping by increasing the self-induction of the cable. This can be done for example by including induction coils in the cable at suitable distances, or by providing the cable with a sheath of iron or other material which can be highly magnetized. However, by increasing the self-induction the damping can be reduced only to a certain point, and the diagram which represents the damping as a function of the self-induction has a minimum, so that when increasing the self-induction beyond a certain point the damping begins again to rise. Generally speaking the minimum of the damping which can be attained under certain conditions is so much the smaller, the smaller the dielectric loss of energy is which is produced within the insulating cover of the cable when talking currents pass through the core of same. By reason of these losses the phase of the charge of the cable lags a certain angle relatively to the voltage, which angle may be termed the angle of dielectric loss. The minimum damping which can be attained depends on this angle. Therefore the angle of loss of the insulation must be reduced as far as possible. For this reason in paper insulated cables which are inclosed within a lead coating air spaces are provided. In case of long submarine cables which are located at considerable depth this can not be done. Heretofore such cables have been insulated by means of gutta-percha, and it has also been suggested to use balata as an insulating medium. Now the dielectric losses of these substances are high. As long as such cables were used with their own self-induction which was not high such losses were of no practical import, while they are of high import in case of cables in which the inductivity has been raised by special means.

In case of uniform and constant distribution of the self-induction and in case of the most favorable charge by self-induction the minimum damping follows the equation $$\beta \min. = \sqrt{R.G},$$

where R represents the effective resistance of the conductor, G the effective loss through the dielectric. In case of telephone cables this value depends practically only on the dielectric losses. If $\delta$ represents the angle of dielectric loss, $\omega$ the pulsation of talking currents, that is number of periods in $2\pi$ seconds, we have the following equation:

$$G = \omega.C.tg\delta.$$

The capacity of the cable can be substituted by the product of the dielectric constant $\varepsilon$ and the capacity $C_0$ of the cable in which the dielectric is provided by air. In view of these conditions the formula for the minimum damping can be written as follows:

$$\beta \min. = \sqrt{\omega R C_0}. \sqrt{\varepsilon tg\delta}.$$

This formula shows, that for comparing different substances with reference to their usefulness as insulating coverings of telephone cables with increased inductivity only the value $$\sqrt{\varepsilon.tg\delta}$$

must be considered, and that the second factor $$\sqrt{\omega R C_0}$$

does not depend on the material of the dielectric.

In case of cables in which the inductivity is distributed at intervals and where the coils have the most favorable dimension and disposition, the minimum damping which can be obtained amounts to $$\beta \min. = \sqrt{R(G + \frac{C}{\tau})},$$

in which equation $\tau$ is the time constant of the coils, and the other characters designate the same values as in the previous equations. By a similar consideration as has been made with reference to a cable with a constantly and uniformly distributed inductivity the formula of the minimum damping can be written down as follows:

$$\beta \min. = \sqrt{\omega.R.C_0.}\sqrt{\epsilon(tg\delta + \frac{1}{\omega.\tau})}.$$

Also in this case for comparing materials for insulating coverings only the second factor may be considered. In case of submarine cables coils are provided which have a time constant of about 0.02 seconds. According to experiments made by Breisig, Devaux-Charbonnel, Cohen and Shepherd, and K. W. Wagner, the talking currents have an average pulsation of $\omega = 5000$. Therefore for coil cables the factor of the damping formula which depends on the insulating material is $$f_s = \sqrt{\epsilon(tg\delta + \frac{1}{\omega.\tau})},$$

while for cables with uniformly distributed inductivity, or the so-called Krarup-cables, the factor is $$f_k = \sqrt{\epsilon tg\delta}.$$

The smaller the values $f_s$ and $f_k$ are for a certain material, so much the smaller is the minimum damping which can be obtained, and therefore so much the greater is the range of a telephone cable with increased inductivity which is insulated with the said material. Therefore the object of the improvements is to reduce the damping of cables of the class referred to by reducing the dielectric losses of the insulating covering, and I have discovered that in case of gutta-percha and balata this can be done by withdrawing from the said substances resin. To illustrate the effect I shall give hereinafter a table which shows the result of experiments made with pure balata. Similar results as by removing resin must be obtained by adding substances which do not contain the resins which primarily cause the dielectric losses in gutta-percha and balata. The green gutta-percha which is obtained from the leaves and young shoots of the gutta-percha trees contains only a small amount of resin. Therefore by adding green gutta-percha the dielectric losses of ordinary gutta-percha and balata may be reduced. This effect is increased as the percentage of green gutta-percha is increased, and it has its maximum when using pure green gutta-percha. The effect of adding green gutta-percha appears from a comparison of the figures given under Nos. 1 and 7 or 5 and 6.

Of course, mixtures which are poor in resin can also be obtained by adding suitable gutta-percha substitutes which are poor in resin. Experiments have shown, that good results are obtained by adding artificial gutta-percha made according to the process of Gentzsch, the so-called gutta-gentzsch, which is described in German Patent No. 116092. The low dielectric losses of this substance are particularly prominent, because the substance has in addition a dielectric constant which is below those of gutta-percha and balata. The following list also gives the values of the factors $f_s$ and $f_k$ of pure gutta-gentzsch on which the damping depends. Also in this case it may be under circumstances advisable to add up to 100% of gutta-gentzsch, i. e. to use gutta-gentzsch as an insulating medium for cables of the class referred to.

Table.

| No. | Material. | $f_k$ | $f_s$ |
|---|---|---|---|
| 1 | Natural balata; resin 48%... | 0.128 | 0.224 |
| 2 | Balata from which resin has been removed to an amount of 33%... | .111 | .204 |
| 3 | Balata from which resin has been removed to an amount of 28%... | .107 | .203 |
| 4 | Balata from which resin has been removed to an amount of 22%... | .090 | .199 |
| 5 | Pure gutta-percha... | .272 | .324 |
| 6 | Gutta-percha containing 40% of green gutta-percha... | .226 | .288 |
| 7 | Balata containing 33% of green gutta-percha... | .106 | .209 |
| 8 | Pure gutta-gentzsch... | .128 | .205 |

The accompanying drawing shows, by way of example, one of many possible embodiments of the invention.

Figure 2:
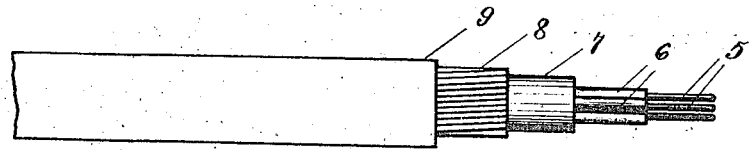

Figure 1 is a transverse sectional view of a cable. Fig. 2 is a side view successive layers being removed.

The copper conductors 5 are covered by an insulation 6 natural or artificial gutta-percha or balata, from which a portion of the resin has been removed or in which the proportion of resin is low. Around the bunch of insulated conductors are placed jute wrappings around which is placed an iron wire armor 8 around which is placed other wrappings of jute 9.

The object of the invention may also be obtained by providing an insulating covering which consists of several layers, all of which or several ones of which consist of the aforesaid substances.

I claim:

1. A cable for self inductive load, the insulating cover of which consists of any kind of gutta-percha like material in which the proportion of resin is small.

2. A cable for self inductive load, the insulating cover of which consists of any kind of gutta-percha like material mixed with gutta-percha like material poor in resin.

3. A cable for self inductive load, the insulating cover of which consists of any kind of gutta-percha like material mixed with gutta-percha substitutes which are poor in resin.

4. A cable for self inductive load, the insulating cover of which consists of any kind of gutta-percha like material mixed with gutta-gentzsch.

In testimony whereof I affix my signature in the presence of two witnesses.

Dr. KARL WILLY WAGNER.

Witnesses:
WOLDEMAR HAUPT,
HENRY HASPER.